Oct. 22, 1963   J. D. McMICHAEL   3,108,065
FUEL TANK STRAINER
Filed Sept. 29, 1959

INVENTOR.
John D. McMichael
BY
S. C. Thorpe
ATTORNEY

3,108,065
FUEL TANK STRAINER

John D. McMichael, Swartz Creek, Mich., assignor to General Motors Corporation, Detroit, Mich., a corporation of Delaware
Filed Sept. 29, 1959, Ser. No. 843,184
2 Claims. (Cl. 210—172)

This invention relates to strainers for filtering gasoline or other liquid fuel in the tank of an automotive vehicle.

Strainers attached to the suction intake tube within such tanks have been in common use heretofore, including strainers made of flexible fabric material having the property of selectively passing fuel while blocking intake of water as well as sediment, dirt, etc. Because of this gasoline/water selectivity, fuel strainers made of this material may be located in the tank closely adjacent the bottom wall in order that the full capacity of the tank may be utilized without risk of drawing an excessive amount of water into the fuel line to the vehicle engine. Such strainers of this type have heretofore been constructed, however, with substantial reinforcement of the filtering material, both to prevent its collapse under the suction applied through the fuel line, and to maintain the strainer in engagement with the bottom of the fuel tank. Hence, such strainers have been formed as an elongated tubular body, open at one end to the fuel suction line and closed at its opposite end, with metal stiffening reinforcements including a metal lower end cap. A problem has existed in using such a strainer, because with normal vibration in vehicle use the lower metal reinforcement or end cap tends to wear a hole in the bottom wall of the tank if allowed to bear against it over a prolonged period of vehicle operation. To avoid this, it has been necessary to insure that some spacing is maintained between the tube and the bottom of the tank, which poses a further burden on the vehicle manufacturer as well as loses some of the advantage in using a strainer having the gasoline/water selective filtering feature.

In accordance with my invention, I have overcome the aforementioned objectionable features of such fuel strainers and have further improved their design in a manner substantially reducing their cost of construction. I accomplish these improvements and advantages by closing the lower end of the tubular strainer element by simply diametrically flattening such end. Sealing of the flattened end may conveniently be accomplished by dielectric heating (in the case of thermosetting plastic being used for the filtering material), adhesive bonding or mechanical clamping of the edges together. Also in accordance with the invention, the length of the strainer is selected such that it overextends the distance between the fuel suction line and the bottom wall of the tank, so that the lower end portion of the strainer lies in more or less deflected engagement against the bottom wall of the tank. By reason of the flexibility of the strainer body tube and the absence of any metal reinforcement of its lower end, there is no danger of wear of the tank bottom wall in vehicle operation.

These and other features and advantages of the invention will be better understood from the following description of one preferred embodiment thereof, selected for illustration with reference to the attached drawing, wherein.

Figure 1:
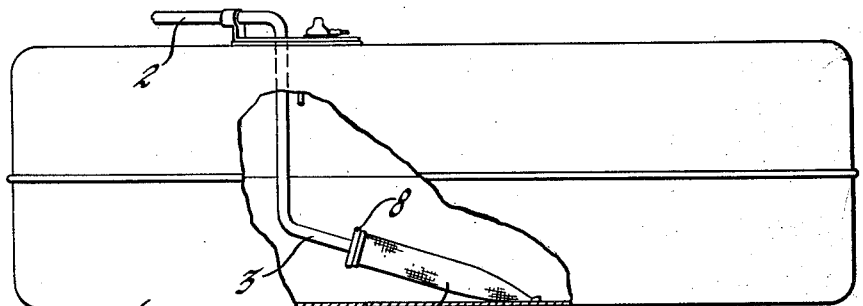
FIGURE 1 is an elevational view of an automotive vehicle fuel tank, with a portion of its side wall broken away to illustrate the mounting of the fuel strainer therein.
Figure 2:
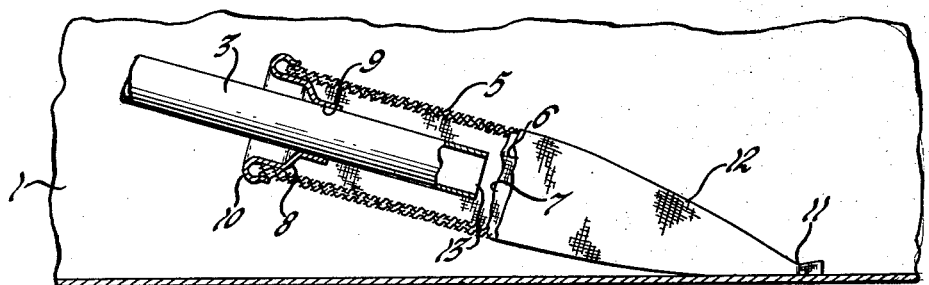
FIGURE 2 is an enlarged fragmentary view similar to FIGURE 1, showing the upper portion of the strainer and a part of the fuel suction tube broken away and in section.
Figure 3:
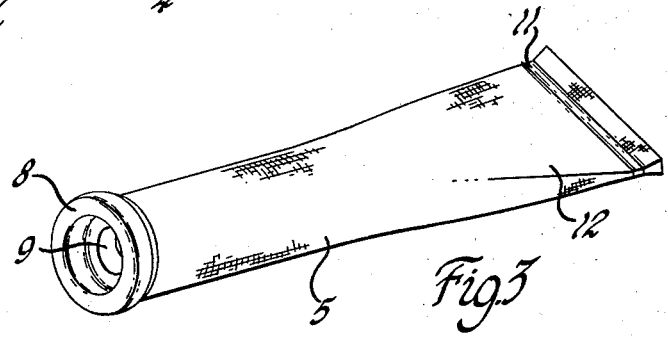
FIGURE 3 is a perspective view of the improved fuel strainer, shown removed from the tank.
Figure 4:
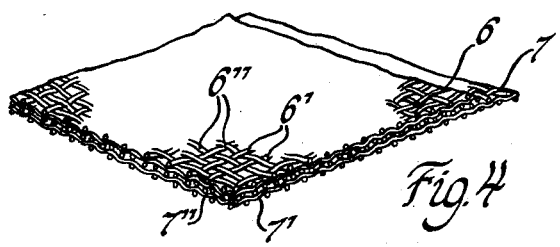
FIGURE 4 is a further enlarged fragmentary view of the material from which the hollow body portion of the strainer is made.

Referring now in detail to the drawing, numeral 1 designates a conventional gasoline storage tank as is commonly mounted on the frame (not shown) of automotive vehicles. Fuel contained within the tank is withdrawn via a suction tube 2 leading to the vehicle engine (not shown), which tube extends into the tank with its lower end 3 terminating in spaced relation above the bottom wall 4 thereof. The tank, including the bottom wall 4, is constructed of relatively rigid metal or other material having sufficient strength to support the fuel therein against the inertia and vibration forces imposed during vehicle operation. Surrounding the lower end 3 of the suction tube is my improved strainer 5. This is formed of flexible material, preferably polyvinylidene chloride available commercially under the designation "Saran," extruded to .010 diameter yarn and woven to 90 x 46 count. The resulting fabric or cloth is then calendered with sufficient force to produce a pressure drop of 3.50 to 7 inches of water when passing 10 cubic feet of air (corrected to .08 pound per cubic foot density at 32° F. and 14.696 pounds per square inch atmospheric pressure) through a three inch diameter double thickness section of the cloth. Two such thicknesses 6 and 7 are shown in magnified form in FIGURE 4, the warp threads 6' and woof threads 6'' of the one layer 6 extending parallel with the corresponding threads 7' and 7'' of the other layer 7. The elongated hollow body of the strainer 5 is formed of such material, the body initially being tubular in shape throughout its length. Into the upper end thereof is inserted an annular bushing 8 of metal or other rigid material having a bore 9 snugly embracing the suction tube 3 and an external flange 10 which is reversely bent to clampingly support and close that end of the strainer. The suction tube extending through the bushing 8 forms the single outlet for fuel from the strainer. The opposite end is diametrically flattened as indicated at 11 in FIGURES 2 and 3, the portion 12 of the body adjacent this flattened end section being gradually tapered as shown. Sealing of the end section 11 is effected most conveniently in the case of the aforementioned "Saran" cloth by well known dielectric heating means, although such sealing may otherwise be done by the use of adhesive between the pressed-together surfaces, or by stapling the same, etc. In any event, the flexibility of the strainer body below the bushing 8 is unimpaired since the body extends therefrom in a totally self supporting manner. The length and cross-section of the tubular body are made sufficiently large to accommodate the maximum flow fuel delivery requirements of the vehicle even when the strainer is only partially submerged in fuel within the tank. In accordance with the invention, the length of the strainer body is also selected so that when attached by the bushing 8 to the suction tube 3 the lower end 12, 11 of the strainer overextends the spacing between the tube 3 and the bottom wall 4 of the tank, whereby the lower end of the strainer lies against the tank wall 4 to insure their remaining in abutting engagement with each other. Because of the flexibility of the strainer body and the absence of any rigid reinforcing means in effecting the closure of its lower end section 11, such abutting contact with the tank bottom wall 4 can be maintained without danger of the strainer wearing a hole through the tank during vehicle operation.

I have found that with a strainer constructed as described, and of the aforementioned double thickness "Saran" cloth, it is possible to completely empty the vehicle tank of gasoline under normal vehicle operating conditions. Any water in contact with the strainer is substantially prohibited from passing through it because of the greater wetability of such cloth by hydrocarbon fuel, and it is believed that passage of air through the strainer is substantially precluded by a capillary action of the gasoline between the layers of the cloth. Gasoline that lies between the layers 6 and 7 apparently seals the strainer quite effectively against air being drawn through it. As a result, all the gasoline can be withdrawn from the tank via the strainer 5 and suction tube 3. It is only necessary to so locate the suction tube intake 13 with reference to the bottom wall 4 of the tank in accordance with the minimum suction expected to be applied to the tube end 3 and the pressure drop between the exterior and interior of the strainer, to enable complete evacuation of fuel from the tank. Such height of the suction tube intake 13 can be readily selected experimentally, after the minimum suction to be applied and strainer area have been determined. It will be understood that the upper portion of the tank is vented to atmosphere, which vent may be in the form of simply an opening in the usual tank filler cap (not shown).

While only a single preferred embodiment of the invention has been disclosed, it is appreciated that numerous minor changes in the construction and arrangement of the parts will be made without departing from the spirit and scope of the invention as hereinafter claimed.

I claim:

1. In a fuel strainer for attachment to the fuel intake end of a suction tube in a vehicle fuel tank, a flexible generally tubular shaped element having its side walls constructed of flexible fabric which is readily wetted by hydrocarbon fuel but not readily wetted by water and which is resistant to passage of air therethrough when wetted, a bushing of rigid material extending into one end of said element and having a reversely turned flange extending radially of and back upon the external periphery of the element at said end, said bushing having a bore adapted to snugly receive the suction tube, the opposite end of said element terminating with a diametrically flattened section effecting its closure, the flexibility and length of said element being such that when installed on a suction tube whose intake end is spaced from the bottom of the tank said flattened end section is deflectable by and resiliently bears against the tank bottom.

2. In liquid fuel supply means for a vehicle, a fuel tank having a rigid bottom wall, a suction tube extending into the tank and terminating above said bottom wall, and a fuel strainer having a flexible generally tubular body of flexible material which is readily wetted by hydrocarbon fuel but not readily wetted by water and which is resistant to passage of air when wetted, annular means securing one end of the strainer body to the tube, the opposite end of said body tapering to a diametrically flattened section deflectable by and resiliently abutting the tank bottom wall, whereby fuel adjacent the bottom wall may be withdrawn from the tank via the strainer and tube and the flexibility of the strainer body precludes excessive wear between it and the tank bottom wall.

References Cited in the file of this patent

UNITED STATES PATENTS

| | | |
|---|---|---|
| 1,199,628 | Stauffer | Sept. 26, 1916 |
| 1,694,743 | Hinman | Dec. 11, 1928 |
| 2,521,094 | Rein | Sept. 5, 1950 |
| 2,548,965 | Gaugler | Apr. 17, 1951 |
| 2,644,586 | Cutter | July 7, 1953 |
| 2,788,125 | Webb | Apr. 9, 1957 |
| 2,923,411 | Oster | Feb. 2, 1960 |